United States Patent
Webster

(10) Patent No.: US 7,400,286 B2
(45) Date of Patent: Jul. 15, 2008

(54) DEVICE AND METHOD FOR USE IN THE VERIFICATION OF HANDWRITING

(75) Inventor: John R Webster, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/585,228

(22) Filed: Oct. 24, 2006

(65) Prior Publication Data

US 2007/0085723 A1    Apr. 19, 2007

Related U.S. Application Data

(63) Continuation of application No. PCT/GB05/01182, filed on Mar. 24, 2005.

(30) Foreign Application Priority Data

May 8, 2004    (GB)    ................... 0410313.1

(51) Int. Cl.
*H03M 1/12*    (2006.01)
(52) U.S. Cl. .................... 341/155; 341/156; 382/187
(58) Field of Classification Search .......... 341/110–160
See application file for complete search history.

(56) References Cited

U.S. PATENT DOCUMENTS 4,122,435 A    10/1978    Greenaway 6,556,635 B1 *    4/2003    Dehghan .................... 375/345
6,741,650 B1 *    5/2004    Painchaud et al. ..... 375/240.21

FOREIGN PATENT DOCUMENTS

| DE | 3 541 031 | 5/1986 |
| DE | 10241328 | 3/2004 |
| GB | 2 159 998 | 12/1985 |
| WO | 93/00659 | 1/1993 |

OTHER PUBLICATIONS

Leslie Green; The Alias Theorems: Practical Undersampling For Expert Engineers; Reed Electronics; Jun. 21, 2001.

* cited by examiner

*Primary Examiner*—Lam T Mai
(74) *Attorney, Agent, or Firm*—W. Warren Taltavull; Manelli Denison & Selter PLLC

(57) ABSTRACT

A device (10) for use in the verification of handwriting, comprising: a body (12) having a surface (11) over which a writing instrument (8) is moved during the generation of a piece of handwriting; a transducer (14) for transducing stress-wave activity in the body (12) to an analogue time varying signal (15); and digitizing means (22) for converting the analogue time varying signal (15) into a digital signal (27, 31, 11), the digitizing means (22) comprising a sampler (22) arranged to under-sample the analogue time varying signal (15).

16 Claims, 1 Drawing Sheet

DEVICE AND METHOD FOR USE IN THE VERIFICATION OF HANDWRITING

This is a continuation of International Application Number PCT/GB2005/001182 filed Mar. 24, 2005, designating the United States.

FIELD OF THE INVENTION

Embodiments of the invention relate to a device and a method for use in the verification of handwriting. In particular, embodiments relate to the formation of a digital signal from an analogue signal representing stress-wave activity produced during a piece of handwriting.

BACKGROUND OF THE INVENTION

It is known from GB 2159998B to detect and store a time varying reference characteristic such as stress wave activity produced in a body by a writing instrument during the generation of a piece of handwriting e.g. a signature.

A contemporaneously created time varying test characteristic, such as stress wave activity produced in a body by a writing instrument during the generation of the same piece of handwriting, is then compared with the stored time varying reference characteristic. The comparison determines whether the reference and test characteristics have a common origination e.g. whether the pieces of handwriting have a common author.

It would be desirable to convert the analogue time varying signals into the digital domain. This would provide improved error correction facilities which would in turn enable the transmission of the time varying characteristic over a communication channel.

To achieve this, it would be necessary to add an analogue to digital conversion step to the above described process. For example, a time varying reference characteristic such as a stress wave activity produced in a body by a writing instrument during the generation of a piece of handwriting would be detected and converted to a digital reference signal. The digital reference signal would then be stored. A contemporaneously created time varying test characteristic, such as stress wave activity produced in a body by a writing instrument during the generation of the same piece of handwriting, would be converted to a digital test signal. The digital test signal would then be compared with the stored digital reference signal. The comparison would determine whether the time varying reference and test characteristics have a common origination e.g. whether the pieces of handwriting have a common author.

Nyquist's sampling criterion dictates the sampling rates required to convert an analogue signal to a digital signal. The criterion states "A signal having no significant spectral components above a frequency $f_H$ Hz is specified completely by its value at uniform spacings, no more than $1/(2\ f_H)$ seconds apart". This corresponds to $f_s \geq 2f_H$ (Hz) where $f_s$ is the sampling frequency and $f_H$ is the highest frequency component of the analogue time varying signal.

The analogue time varying signal described in GB 2159998B has a maximum frequency component typically in the range of 100 kHz. The analogue time varying signal should, according to Nyquist's sampling criterion, be sampled at greater than twice its frequency i.e. at a rate of at least 200 kHz. The digital representation of a 2 sec portion of the analogue time varying reference signal at a resolution of 32 bits would require 1.6 MB of memory and 400,000 samples. Consequently, if a substantial number of digital reference signals are to be stored together, significant storage capacity would be required. Furthermore, the comparison of the digital reference signal and the digital test signal at 400,000 points would be processor intensive, and may be difficult to perform in real time.

Nyquist's criterion is fundamental to digital electronics, so any reduction in bandwidth of the digital signal would traditionally have come from reducing the resolution to 8 or 16 bits.

SUMMARY OF THE INVENTION

According to one aspect of the present invention there is provided a device for use in the verification of handwriting, comprising: a body having a surface over which a writing instrument is moved during the generation of a piece of handwriting; a transducer for transducing stress-wave activity in the body to an analogue time varying signal; and digitizing means for converting the analogue time varying signal into a digital signal, the digitizing means comprising a sampler arranged to under-sample the analogue time varying signal.

According to another aspect of the present invention there is provided a method of forming a digital signal from an analogue signal representing stress-wave activity produced during a piece of handwriting, comprising the step of: under-sampling the analogue signal to form the digital signal.

According to another aspect of the present invention there is provided a system for use in the verification of handwriting, comprising: a transducer for transducing stress-wave activity, arising when a writing instrument is moved during the generation of a piece of handwriting to an analogue time varying signal; and digitizing means for converting the analogue time varying signal into a digital signal, the digitizing means comprising a sampler arranged to under-sample the analogue time varying signal.

Under-sampling is sampling at a rate substantially less than that specified by Nyquist's criterion. The inventor has thus gone against one of the fundamental tenets of digital electronics, Nyqusit's theorem, to provide a working solution to the above-described problem.

BRIEF DESCRIPTION OF THE DRAWINGS

For a better understanding of the present invention reference will now be made by way of example only to the accompanying drawings in which.

DETAILED DESCRIPTION OF THE INVENTION

Figure 1:
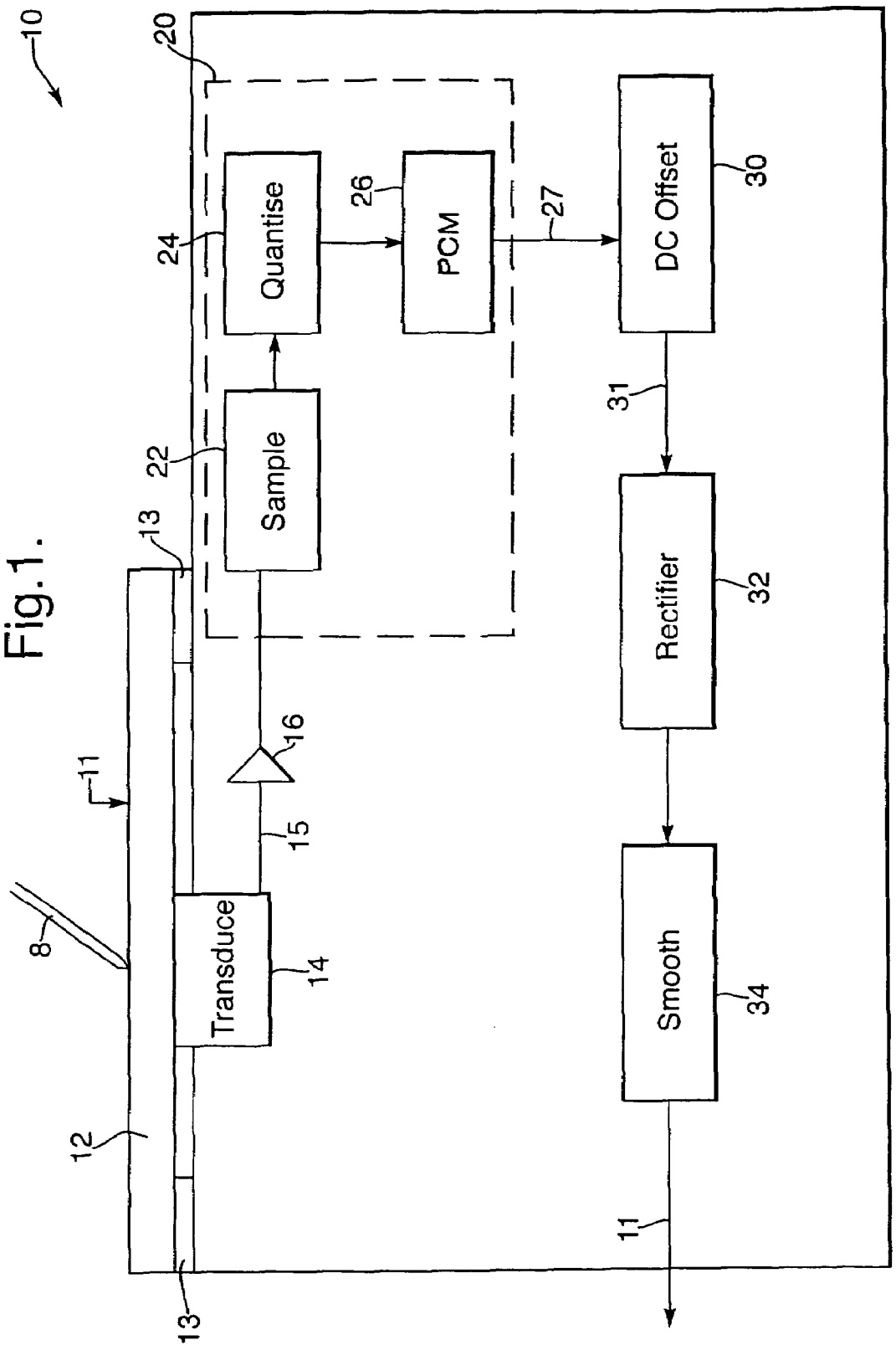
FIG. 1 illustrates a device for detecting a time varying characteristic and producing a digital signal representative of that characteristic.

FIG. 1 illustrates a device for detecting a time varying characteristic such as a stress wave activity produced in a body by a writing instrument during the generation of a piece of handwriting e.g. a signature.

The device 10 comprises: a body 12 having an upper surface 11; acoustic isolators 13; a resonant acoustic emission transducer 14; an amplifier 16; an analogue to digital converter 20; a dc offset 30; a rectifier 32 and a smoothing circuit 34. The dc offset 30, rectifier 32 and smoothing circuit 34 may, for example, be done in a digital signal processor (DSP) under the control of software.

The body 12 may be formed from a plate of steel or other suitable material. The body 12 is mounted on acoustic isolators 13 such as rubber blocks to help acoustically isolate it from the surface on which the device 10 is located. These are also chosen so that the plate is not tightly clamped, which would result in signal degradation.

The conventional resonant acoustic emission transducer 14 is attached to the body 12 for the purpose of detecting stress-wave activity associated with the body 12. Such stress-wave activity is produced by the generation of a piece of handwriting on the surface 11 of the body 12 using a suitable instrument 8, such as a pen, pencil or other writing implement or a stylus. A piece of paper or other similarly surfaced material may be present on the body 12 to receive a record of the handwriting or alternatively the piece may be written directly on the steel plate. The friction between the instrument and the writing surface is such that detectable stress-waves are produced within the body 12.

The transducer 14 detects the stress-wave activity produced in the body 12, resulting from the generation of a piece of handwriting using the instrument 8. The transducer 14 is arranged to detect the stress wave activity over a narrow band of frequencies typically in the region of 100 kHz. This is one frequency range that can be efficiently transmitted within the body 12 but is quickly damped by air and the acoustic isolators 13, so that the transducer 14 detects stress-wave activity arising substantially only from the handwriting. Other frequency ranges can be used and these could, for example, be much higher frequencies.

Alternatively, the transducer 14 may be placed in the writing instrument or may use air borne detection after a short propagation distance through the air. The transducer may be located on/in the body 12, on/in the writing instrument 8 or remote coupled by air borne stress waves.

The transducer may for example produce an amplitude modulated single frequency (100 kHz) output voltage 15, which is in accordance with the detected stress-wave activity. The output voltage is an analogue time varying signal.

The analogue output voltage 15 of the transducer may be amplified by amplifier 16 and then provided to an analogue to digital converter (ADC) 20. The ADC 20, in this example, comprises a sampler 22, a quantiser 24 and a pulse code modulator 26. The sampler 22 under-samples the analogue output voltage 15.

It samples it at a frequency F substantially less than the frequency $f_s$ specified by the Nyquist criterion. The frequency F may, for example, be less than 20 kHz, whereas the Nyquist criterion would specify a rate of at least 200 kHz. The sampler 22 provides discrete voltage samples taken, at regular intervals of time 1/F, to the quantiser 24. The quantiser 24 approximates these voltage samples to the nearest one of an allowed set of voltage levels. The pulse code modulator 26 converts each quantised level to a binary word and a flag and includes them in a digitized signal 27 provided to dc offset 30. The binary word gives the quantised level and the flag indicates whether it is positive or negative. The number of bits in the binary word will depend upon the resolution of the quantiser 24.

The dc offset 30, corrects for any dc offset within the digitized signal 27. For example, if each binary word associated with a positive flag has a value $d_i$ and each binary word associated with a negative flag has a value $D_i$ then one would expect that the summation of $d_i$ over N samples should equal $D_i$ over the same N samples, where N is large. The dc offset may be expressed as:

offset=$1/N(\Sigma d_i + \Sigma D_i)$

The dc offset once calculated, may be quantised and subtracted from each digital word of the digitized signal 27 to produce a dc offset corrected digitized signal 31. The flag values are then re-set relative to the new zero position.

The rectifier 32 then rectifies the dc offset digitized signal 31 by removing the new flag values leaving the dc-offset words.

A smoothing circuit 34 may then adjust individual word values so that they lie upon a smoothly varying curve. This may be achieved using a programmed microprocessor. The resultant set of binary words represents the digital test or reference signal which is provided as an output signal 11.

Consequently, according to one embodiment in which the sampler 22 samples at 1 kHz, a 2 sec portion of the analogue time varying signal 15 can be represented as a set of 2000 32 bit words requiring 8 kB of memory. This can be further sub-sampled to reduce the storage/processing requirements. It may for example be sub-sampled at 50 Hz.

Although embodiments of the present invention have been described in the preceding paragraphs with reference to various examples, it should be appreciated that modifications to the examples given can be made without departing from the scope of the invention as claimed. In particular, although particular types of digitizer 20, dc offset 30, and rectifier 32 have been described, it will be appreciated by the skilled person that various other alternative types and methods can be used. For example, the ADC 20 may be set such that a zero value of the digitized signal 27 corresponds to the expected minimum amplified analogue output voltage and a maximum value of the digitized signal 27 corresponds to the expected maximum amplified analogue output voltage. The digitized signal 27 output by the ADC 20 will have a positive value between its minimum (e.g. 0) and its maximum (e.g. 32000). The dc offset 30 calculates the average of the digitized signal values output by the ADC 20 and subtracts this average from each digital word of the digitized signal 27 to produce a dc offset digitized signal 31. The zero value of the dc offset digitized signal 31 is now true zero. The dc offset digitized signal is then rectified by rectifier 32 and smoothed by smoothing circuit 34. This methodology for removing analogue drift from the digital signal is simpler to implement than that described previously.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A device for use in the verification of handwriting, comprising:
   a body having a surface over which a writing instrument is moved during the generation of a piece of handwriting;
   a transducer for transducing stress-wave activity in the body to an analogue time varying signal, and;
   characterised by digitizing means for converting the analogue time varying signal into a digital signal the digitizing means comprising a sampler arranged to under-sample the analogue time varying signal.

2. A device as claimed in claim 1, wherein the sampler operates at a sample frequency substantially less than a sample frequency specified by Nyquist's criterion.

3. A device as claimed in claim 1 wherein the analogue time varying signal is a modulated carrier signal having substantially a carrier frequency.

4. A device as claimed in claim 3, wherein the carrier frequency is in the region of 100 kHz.

5. A device as claimed in claim 2, wherein the sample frequency is less than 20 kHz.

6. A device as claimed in claim 1, further comprising means for dc offsetting the digital signal.

7. A device as claimed in claim 1, further comprising means for rectifying the digital signal.

8. A device as claimed in claim 1, wherein the digital signal includes a set of binary words and the digitizing means further comprises means for independently varying the binary words.

9. A method of forming a digital signal from an analogue signal representing stress-wave activity produced during a piece of handwriting, comprising the step of: under-sampling the analogue signal to form the digital signal wherein the step of under-sampling comprises sampling the analogue signal at a first frequency substantially less than its highest frequency component.

10. A method as claimed in claim 9, wherein the analogue signal is a modulated carrier signal and the highest frequency component of the analogue signal is the frequency of the carrier signal.

11. A method of forming a digital signal from an analogue signal representing stress-wave activity produced during a piece of handwriting, comprising the steps of:

under-sampling the analogue signal to form the digital signal and;

dc offsetting the digital signal.

12. A method as claimed in claim 9, further comprising the step of: rectifying the digital signal.

13. A system for use in the verification of handwriting, comprising: a transducer for transducing stress-wave activity, arising when a writing instrument is moved during the generation of a piece of handwriting to an analogue time varying signal and; characterised by digitizing means for converting the analogue time varying signal into a digital signal, the digitizing means comprising a sampler arranged to under-sample the analogue time varying signal.

14. A system as claimed in claim 13, further comprising a body having a surface over which the writing instrument is moved, wherein the transducer is associated with the body.

15. A system as claimed in claim 13, further comprising a body having a surface over which the writing instrument is moved, wherein the transducer is separate from the body and the writing instrument.

16. A system as claimed in claim 13, further comprising a writing instrument comprising the transducer.

* * * * *